United States Patent [19]

Fleming

[11] Patent Number: 4,824,160

[45] Date of Patent: Apr. 25, 1989

[54] VISOR CONTROL

[75] Inventor: Dennis J. Fleming, Holland, Mich.

[73] Assignee: Prince Corporation, Holland, Mich.

[21] Appl. No.: 489,940

[22] Filed: Apr. 29, 1983

[51] Int. Cl.⁴ .............................................. B60J 3/02
[52] U.S. Cl. .................................. 210/17.4; 296/178; 296/11.1; 296/11.12; 292/201
[58] Field of Search ................. 296/97 R, 97 G, 97 F, 296/97 J, 97 K, 97; 160/DIG. 3, 218, 220; 248/293; 292/201

[56] References Cited

U.S. PATENT DOCUMENTS

| 1,686,341 | 10/1928 | Nathanson | 296/97 J |
| 2,101,901 | 12/1937 | Fletcher | 296/97 G |
| 2,596,873 | 5/1952 | Solmes | 296/97 G |
| 2,607,906 | 8/1952 | Sang | 296/97 R |
| 3,008,757 | 11/1961 | Sinnett | 296/97 G |
| 3,021,173 | 2/1962 | Levin | 248/293 |
| 4,111,473 | 9/1978 | Bourrie et al. | 292/201 |
| 4,468,062 | 8/1984 | Marcus et al. | 296/97 K |

FOREIGN PATENT DOCUMENTS 378336 8/1932 United Kingdom ............. 296/97 G

Primary Examiner—Dennis H. Pedder
Attorney, Agent, or Firm—Price, Heneveld, Cooper, DeWitt & Litton

[57] ABSTRACT

A visor control includes a pair of parallel spaced arms, each pivotally coupled at one end to a mounting structure secured to a vehicle headliner and having opposite ends pivotally secured to a sun shield such that the shield can be translated by rotation of the parallel arms between a raised stored position and a lowered use position. A spring extends between the mounting structure and one of the movable elements to impart a force to the shield, tending to return the shield to a stored position. Releasable latching means hold the shield in a lowered position and can be operator actuated or automatically actuated with vehicle door opening to allow the spring to return the shield to the stored position permitting ease of exit from the vehicle.

19 Claims, 2 Drawing Sheets

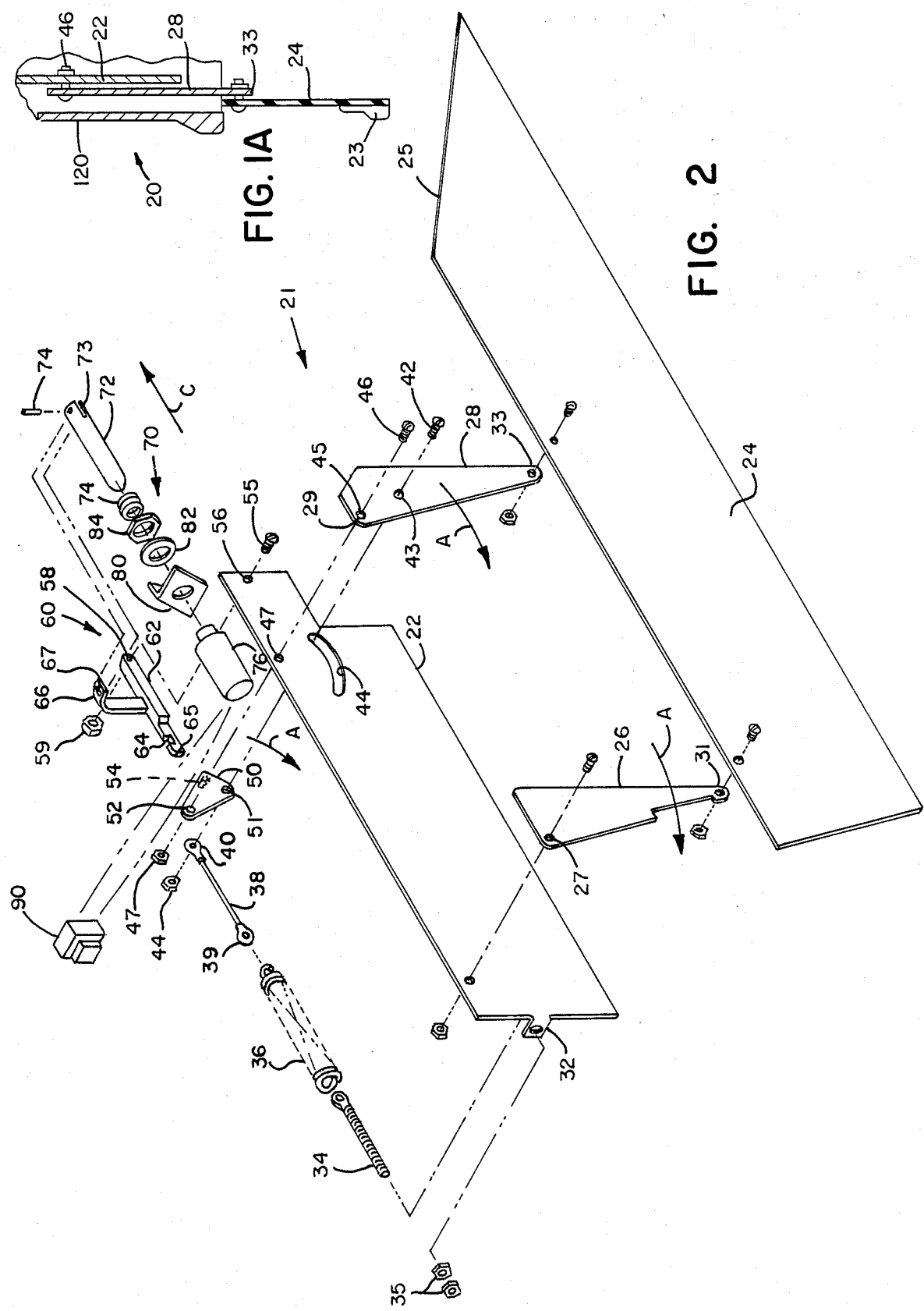

VISOR CONTROL

BACKGROUND OF THE INVENTION

The present invention relates to vehicle visors and particularly visors adapted for use with the side windows.

Conventional visors currently used in vehicles, such as automobiles, typically pivot about a generally vertical axis for movement from the windshield position to a side window position for use in blocking sunlight entering the vehicle from a side. Such movement of the visor during operation of the automobile by the driver, necessitated by a change in vehicle direction with respect to incoming sunlight, can be somewhat hazardous inasmuch as frequently it is necessary to duck under the visor as it is pivoted from the forward windshield position to the side window position. Additionally, with sliding visors of the type disclosed in U.S. Pat. No. 2,289,644 which slide down from the headliner of a vehicle, such visors cannot be employed for shielding sunlight from the side window area. With sliding visors of the type represented by U.S. Pat. No. 2,559,471, the operation of the visor which is guided within an edge track can be extremely troublesome since frequently they will stick and be difficult to operate since they do not slide smoothly between a raised stored and a lowered use position.

SUMMARY OF THE INVENTION

The visor construction of the present invention overcomes the deficiencies of the prior art by providing a pivoting visor assembly particularly adapted for use for a side window of a vehicle.

Visors embodying the present invention include a mounting structure secured to the headliner or roof of a vehicle above a side window and a pair of parallel spaced arms, each pivotally coupled at one end to the mounting structure secured to the vehicle headliner and having opposite ends pivotally secured to a sun shield such that the shield can be translated by rotation of the parallel arms between a raised or stored position above the side window downwardly to a lowered use position. Bias means extend between the mounting structure and one of the movable elements to impart a force to the shield, tending to return the shield to a stored position. Releasable latching means hold the visor in a lowered position and can be operator actuated or automatically actuated with vehicle door opening to allow the bias means to return the shield to the stored position permitting ease of exit from the vehicle.

In one embodiment of the invention, a module, which can be snap-fitted to the vehicle roof, is provided with one or more pivoted visor assemblies recessed behind a decorative panel to cover one or more side windows. These and other features, objects and advantages of the present invention will become apparent upon reading the following description thereof together with reference to the drawings in which:

BRIEF DESCRIPTION OF THE DRAWINGS

FIG. 1A is a partial cross section taken along the plane A—A of FIG. 1;

FIG. 2 is an enlarged, exploded view of a visor assembly embodying the present invention;

DETAILED DESCRIPTION OF THE PREFERRED EMBODIMENT

Figure 1:
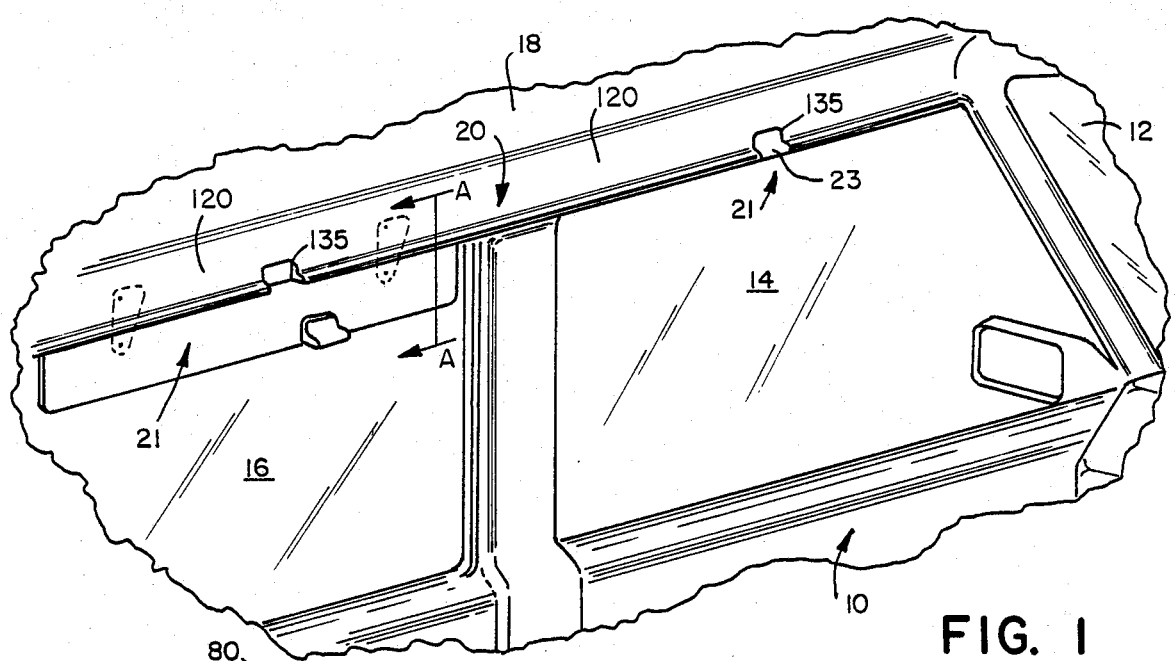
FIG. 1 is a fragmentary perspective view of a vehicle embodying a visor system of the present invention.

Referring initially to FIG. 1, there is shown the left front interior of a vehicle 10 which includes a windshield 12, a left front side window 14 and a left rear side passenger window 16. Extending above the window is the ceiling or headliner area 18 of the vehicle which typically is upholstered with a fabric conforming to the vehicle's general interior decor. The headliner frequently will include a snap-in upholstered panel conventionally secured to the sheetmetal roof of the vehicle by means of conventional mounting structure adapted to receive snap fasteners, screws or the like. Extending along the lower edge of the headliner just above windows 14 and 16 is an integral visor assembly module 20 incorporating a pair of pivoted visor assemblies 21 embodying the present invention with the forward assembly shown in greater detail in FIGS. 2 through 4. In FIG. 1, the forward visor assembly is shown in its retracted position concealed within the module 20 and therefore, the headliner of the vehicle with the rear seat visor assembly being shown in the lowered use position. The construction and operation of one of the substantially identical visor assemblies contained in module 20 is now described in connection with FIGS. 2 through 4.

Referring initially to FIG. 2 which illustrates the visor assembly employed in the front side window area of module 20, a mounting structure including a fixed support member 22 is secured to the headliner or roof of the vehicle. The member 22 has a generally rectangular planar shape, and can be curved to conform to the headliner area above the side window as necessary for a given vehicle. Pivotally coupled to the fixed support member 22 is a sun shield or visor panel 24 which can be opaque, translucent or transparent of a tinted material typically a polymeric material such as an acrylic and having a thickness of about 0.125 inches. Visor panel 24 is trapezoidal in shape having a tapered leading edge 25 corresponding to the angle of the leading edge of window 14 near the top as seen in FIG. 1 to cover this triangular area of the window.

Visor panel 24 is pivotally coupled to support member 22 by means of a pair of spaced parallel and generally triangular legs or arms 26 and 28 each having one end 27 and 29, respectively, pivotally mounted to support member 22 and an opposite end 31 and 33, respectively, pivotally coupled to visor panel 24, as shown to permit pivotal movement of said visor on said legs or arms in a plane generally orthogonal to the pivot axis of said legs or arms and parallel with said legs or arms. Legs or arms 26 and 28 are made of a stiff sheet material such as sheet metal. Members 22, 24, 26 and 28 form a parallelogram providing substantially uniform translating motion of visor panel 24 with respect to member 22 between the lowered position illustrated in FIGS. 1 and 2 in which the legs 26 and 28 are generally vertical and a stored position in which the legs pivot in a counterclockwise direction to a substantially horizontal position (FIG. 4) to elevate the visor to a stored position.

The visor of the present invention includes an automatic retracting mechanism, the components of which are best illustrated in the exploded view of FIG. 2. This visor control is employed for biasing the visor panel 24 in a raised stored position, allowing it to be manually withdrawn into a lowered, releasably latched position, as illustrated by the rear visor panel shown in FIG. 1. The panel is automatically raised to this stored position upon actuation of a release by the passenger or vehicle operator. This visor control mechanism includes support member 22 having anchor means such as an integral tab 32 which receives an adjustment eyebolt 34 for anchoring one end of bias means such as a tension spring 36 having one end inserted in the eyebolt which, in turn, is secured to tab 32 by means of a pair of lock nuts 35. The opposite end of spring 36 is coupled to a cable 38 having eyelets 39 and 40 at opposite ends with eyelet 39 being coupled to spring 36 and the opposite eyelet 40 being coupled to visor control arm 28 and pivotable latch member 50 by means of a bolt or rivet 42 extending through an aperture 43 in arm 28, an arcuate slot 44 in support member 22, aperture 51 in plate 50 and through eyelet 40. Bolt 42 is held in place by a lock nut 44. Aperture 43 in arm 28 is spaced from the pivot point of arm 28 to provide a torque to arm 28, as explained below. Arm 28 is pivotally mounted to support 22 by an aperture 45 through which there extends a bolt 46 which also extends through aperture 47 in support member 22 and through pivot aperture 52 in plate 50 and is secured by means of lock nut 47. Thus, arm 28 and latch plate 50 pivot together about pivot axle 46 with spring 36 urging arm 28 and latch plate 50 in a direction indicated by arrow A in the Figures which is the stored or retracted position of the visor. Arcuate slot 44 in member 22 circumscribes an arc of approximately 45° to permit sufficient movement of coupling pin 42 through the slot to accomodate the full range of motion of visor panel 24.

In order to latch the visor in a lowered position, latch plate 50 includes a latch pin 54 extending from the remaining corner of the triangular plate remote from apertures 51 and 52 for cooperating with pivoted catch assembly 60 including a latching arm 62 and means for selectively actuating the latching arm 62 comprising solenoid assembly 70. Arm 62 is pivotally coupled to support member 22 by means of a pivot bolt 55 extending through an aperture 56 in the support member and through an aperture 58 in one end of member 62 and secured thereto by locking nut 59. The opposite end of arm 62 includes a generally rectangular slot 64 for receiving pin 54, as illustrated in FIG. 3, and a tapered leading edge 65 permitting pin 54 to ride over the end of arm 62 and snap-fit into slot 64 when the visor is manually moved to a lowered position.

Figure 3:
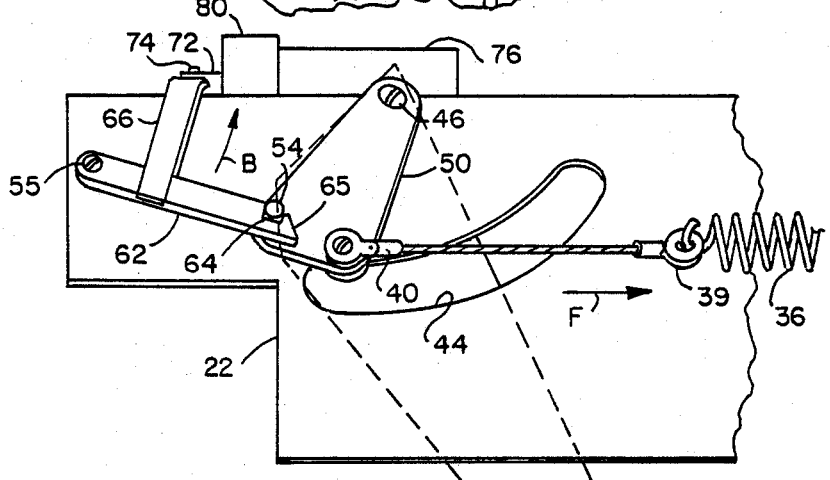
FIG. 3 is a fragmentary side elevational view of the structure shown in FIG. 2 showing the visor mechanism in an extended position.
Figure 4:
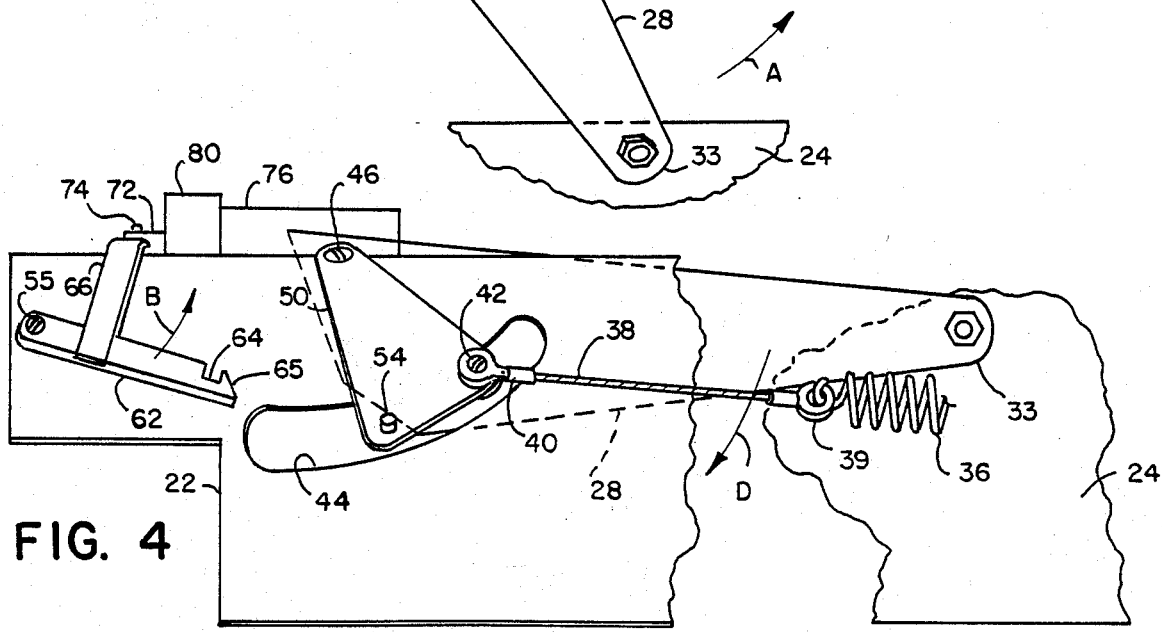
FIG. 4 is a fragmentary side elevational view of the structure shown in FIG. 2 showing the visor mechanism in a retracted position.

Arm 62 is held in a pin latching position pivoted in a direction indicated by arrow B in FIG. 3 by means of a spring actuated solenoid coupled to arm 62 by means of coupling arm 66 integrally secured at one end to arm 62 and having a generally L-shaped configuration with a slot 67 adapted to extend into the plunger 72 of solenoid assembly 70. Plunger 72 includes a slot 73 at one end with a roll pin 74 securing arm 66 to the plunger. The plunger is biased in a generally outwardly direction indicated by arrow C in FIG. 2 by a compression spring 74 within the body 76 of the solenoid assembly. Body 76 includes the electrically actuated solenoid coil and is secured to plate 22 by means of a bracket 80, lock washer 82 and lock nut 84, assembled in a conventional manner with bracket 80 being spot welded or otherwise secured to the top inside edge of member 22, as illustrated in FIGS. 3 and 4. An electrical push-button switch 90 couples the solenoid coil to the vehicle's electrical supply system with switch 90 being conveniently located for operator use such as in an overhead console centrally located in the headliner of the vehicle, in the headliner above the window with which the switch and solenoid assembly is associated. The door activated courtesy light switch, which is standard on vehicles, can also be coupled to the solenoid coil such that in the event the visor is in a lowered latched down position, and the driver or passenger opens the door for egress from the vehicle, the courtesy light switch will actuate solenoid 76 to retract the visor.

The operation of the automatic retracting and visor assembly can best be seen with reference to FIGS. 3 and 4, beginning with the visor in a raised, stored position, as illustrated in FIG. 4. In this position, spring 36 has sufficient tension to maintain the cable 38 taut and the visor in a secured stored position against the spring tension. When it is desired to utilize the visor, a tab or handle 23 formed on the visor panel and extending through and nestably received in a slot or notch 135 of the headliner cover panel 120 (FIG. 1) of module 20 can be used for manually pulling the visor downwardly, pivoting arms 28 and 26 in a direction indicated by arrow D, in FIG. 4, which is opposite arrow A. As this occurs, arm plate 50 also pivots about pivot pin 46 and arm 62 which is in an upwardly biased direction, as indicated by arrow B in FIGS. 3 and 4, is in a position such that pin 54 will, when the visor is fully lowered, contact ramp 65 and subsequently snap into rectangular slot 64 thereby holding the visor in a lowered use position against the spring tension force indicated by arrow F in FIG. 3. In this position, with the solenoid deactivated, spring 74 holds arm 62 in this upwardly biased position. When the door opens or the passenger actuates switch 90 to momentarily actuate solenoid 70, its actuation forces plunger 72 outwardly from the body of the solenoid, pivoting arm 62 in a direction opposite arrow B such that pin 54 disengages from slot 64 allowing spring 36 to pull the arm 28 upwardly in a direction indicated by arrow A, which pivots the visor panel 24 upwardly until it is fully retracted, as shown in FIG. 4.

Various modifications to the preferred embodiment of the invention can be made. Thus, for example, it may be desired to provide two lowered and releasably latched positions in which case a second pivot plate 50, latching arm assembly 60, and release assembly 70 can be provided in association with arm 26 and aligned such that the visor will latch at a partial downward position and be releasably retracted to a stored position from the mid-way position or fully extended by the operator to the fully lowered position and retracted from either position. The bias means can be coupled to either arm or the visor panel itself. Also, the particular form of latching and release mechanism can be varied by, for example, substituting a manual cable release in place of the electrical solenoid system if desired. These and other modifications to the preferred embodiment of the invention will, however, fall within the spirit and scope thereof as defined by the appended claims.

The embodiments of the invention in which an exclusive property or privilege is claimed are defined as follows:

1. A visor assembly for mounting a visor on a headliner of a vehicle under a headliner cover panel comprising:
   a visor panel;

a support panel substantially parallel to said visor panel;

at least a pair of substantially parallel arms spaced from one another and each having an end pivotally secured to said visor panel at spaced locations thereon;

means for pivotally securing the opposite end of each arm to one side of said support panel about a pivotal axis orthogonal to the planes of said visor and support panels, said means permitting movement of said visor panel on said arms between a raised stored position behind said headliner cover panel and a lowered use position; and control means partly located on the other side of said support panel and extending to said one side thereof, said control means including a plate pivotally mounted about the pivotal axis of at least one of said parallel arms on said other side of said support panel and movable from a first to a second position, biasing means for biasing said plate and arms about the pivotal axes of said plate and arms, respectively, and coupling means extending from said other side of said support panel to said one side of said support panel for operatively securing said plate to at least one of said arms whereby said biasing means urges said plate to said second position and said visor panel toward at least one of said stored and use positions, and means for releasably holding said plate and said visor panel in the other of said visor panel's stored and use positions and said plate in said first position.

2. The apparatus as defined in claim 1 wherein said control means urges said visor panel toward a stored position.

3. The apparatus as defined in claim 2 wherein said control means includes latch means coupled to said plate for releasably holding said visor panel in said lowered use position.

4. The apparatus as defined in claim 1 wherein said bias means comprises a spring having one end coupled to said support panel and means coupling an opposite end of said spring to one of said arms and plate.

5. The apparatus as defined in claim 3 wherein said latch means includes a latch arm and latch pin; said latch pin being mounted to said plate; said latch arm having a slot for cooperating with said latch pin; and means for moving said latch arm between pin receiving and pin disengaging positions.

6. The apparatus as defined in claim 5 wherein said latch pin extends from said pivot plate.

7. The apparatus as defined in claim 5 wherein said means for moving said latch arm comprises an electrically actuated solenoid.

8. The apparatus as defined in claim 7 and further including a handle extending outwardly from said visor panel and a recess formed in said cover panel to nestably receive said handle when said visor panel is in a stored position, said handle facilitating the movement of said visor from said stored position.

9. A window visor control assembly for a vehicle comprising:

a visor panel;

at least a pair of parallel arms spaced from one another and each having one end pivotally secured to said visor panel about axes arranged orthogonal to the plane of the visor panel;

support means for supporting the opposite end of each arm to permit pivotal movement of said visor panel on said arms in a first plane generally orthogonal to the pivot axes of said arms and parallel with said arms between a raised stored position and a lowered use position;

a pivot plate located on a second plane parallel to said first plane and pivotally secured to said support means and to at least one of said arms about the pivot axis of said at least one arm for pivotal movement on said second plane about an axis orthogonal to the first and second planes;

bias means coupled to said pivot plate for urging said pivot plate and thus said arms and said visor panel toward at least one of said stored and use positions; and latch means operatively associated with said pivot plate for releasably holding said panel in the other of said stored and use positions.

10. The apparatus as defined in claim 9 wherein said bais means urges said visor panel toward said stored position.

11. The apparatus as defined in claim 10 wherein said bias means comprises a spring.

12. The apparatus as defined in claim 11 wherein said securing means comprises a support member to which said opposite ends of said arms are pivotally secured.

13. The apparatus as defined in claim 12 wherein one end of said spring is coupled to said support member and means coupling an opposite end of said spring to said pivot plate.

14. The apparatus as defined in claim 13 wherein said latch means includes a latch arm movable relative to said pivot plate; a pin mounted on one of said pivot plate and latch arm and a slot on the other of said pivot plate and latch arm for cooperating with said latch pin; and means for moving said latch arm between pin receiving and pin disengaging positions.

15. The apparatus as defined in claim 14 wherein said means for moving said latch arm comprises an electrically actuated solenoid.

16. The apparatus as defined in claim 1 in which the support panel includes an arcuately shaped slot through which said coupling means of said control means extends for connecting one of said arms to said plate.

17. The apparatus as defined in claim 12 in which the support member is a panel on which one side thereof said pivot plate is mounted and on the other side thereof said arms are mounted.

18. The apparatus as defined in claim 17 in which the pivot plate is operatively connected to one of said arms by means extending through the support panel.

19. The apparatus as defined in claim 18 in which the support panel includes an arcuate slot through which the means for connecting the pivot plate to one of said arms extends.

* * * * *

UNITED STATES PATENT AND TRADEMARK OFFICE
CERTIFICATE OF CORRECTION

PATENT NO. : 4,824,160

DATED : April 25, 1989

INVENTOR(S) : D. Fleming

It is certified that error appears in the above-identified patent and that said Letters Patent is hereby corrected as shown below:

Column 6, Claim 10, line 26, "bais" should be --bias--

Signed and Sealed this

Twenty-second Day of May, 1990

Attest:

HARRY F. MANBECK, JR.

*Attesting Officer*     *Commissioner of Patents and Trademarks*